Figure 1:
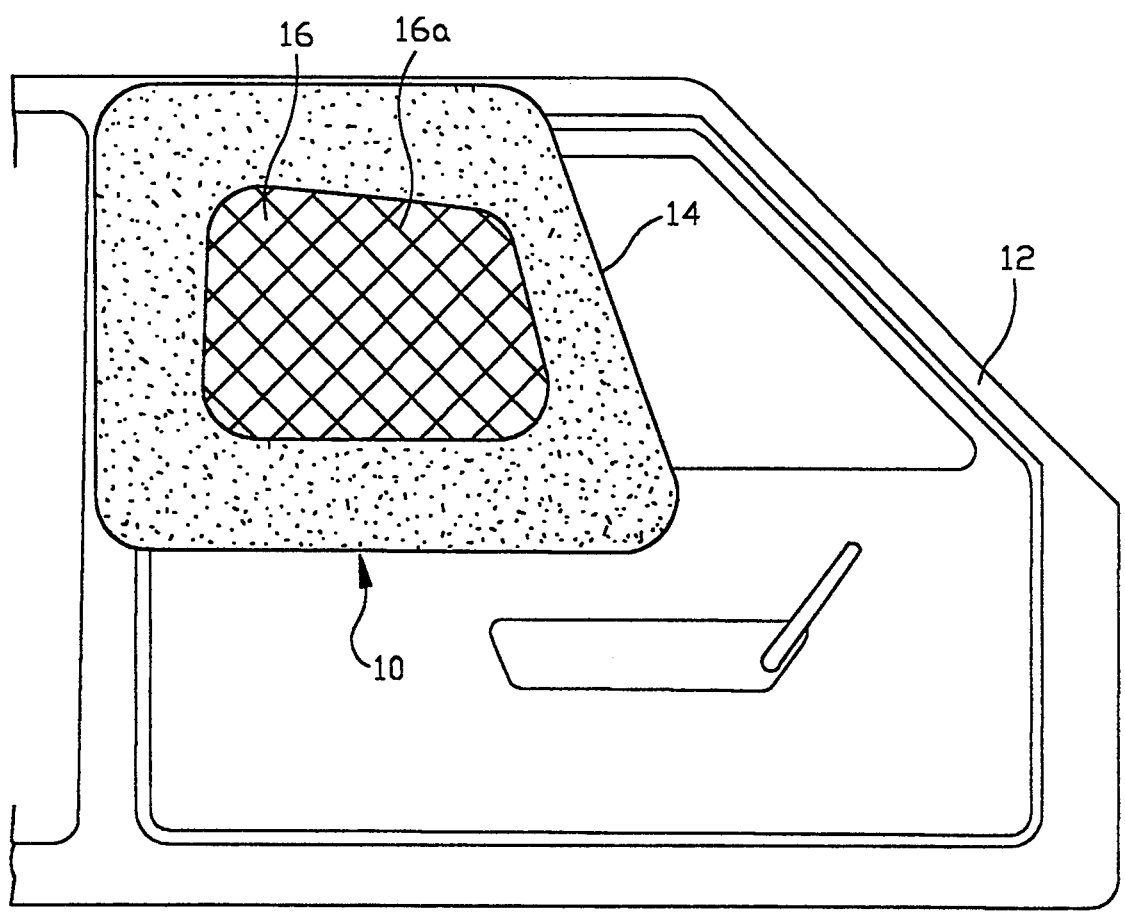

United States Patent [19]
Kolb

[11] Patent Number: 5,439,247
[45] Date of Patent: Aug. 8, 1995

[54] INFLATABLE GAS BAG FOR A VEHICULAR RESTRAINING SYSTEM

[75] Inventor: Andreas Kolb, Schwäbisch-Gmünd, Germany

[73] Assignee: TRW Repa GmbH, Alfdorf, Germany

[21] Appl. No.: 125,425

[22] Filed: Sep. 22, 1993

[30] Foreign Application Priority Data

Sep. 29, 1992 [DE] Germany .................. 42 32 658.3

[51] Int. Cl.⁶ ................................... B60R 21/22
[52] U.S. Cl. ..................... 280/730.2; 280/729; 280/743.1
[58] Field of Search ........... 280/730 A, 730 R, 743 R, 280/748, 749, 751, 753, 728 R, 729, 743 A, 731

[56] References Cited

U.S. PATENT DOCUMENTS

| | | |
|---|---|---|
| 3,731,949 | 5/1973 | Radke . |
| 3,752,501 | 8/1973 | Daniel et al. ............. 280/729 |
| 3,762,741 | 10/1973 | Fleck et al. ............. 280/729 |
| 3,773,350 | 11/1973 | Shibamoto ............. 280/729 |
| 3,784,225 | 1/1974 | Fleck et al. ............. 280/729 |
| 5,072,966 | 12/1991 | Nishitake et al. .......... 280/730 A |

FOREIGN PATENT DOCUMENTS

| | | | |
|---|---|---|---|
| 2137579 | 2/1972 | Germany ............. 280/751 |
| 2222621 | 11/1972 | Germany . |
| 3032444 | 4/1982 | Germany . |
| 3833889 | 4/1990 | Germany . |
| 63-301144 | 12/1988 | Japan ............. 280/743 R |
| 2244496 | 2/1991 | United Kingdom ........ 280/743 R |
| 2268128 | 1/1994 | United Kingdom . |

OTHER PUBLICATIONS

Patent Abstracts of Japan, vol. 14, No. 262, Jun. 6, 1990; JP-A-02 074 440, published Mar. 14, 1990.

*Primary Examiner*—Eric D. Culbreth
*Attorney, Agent, or Firm*—Tarolli, Sundheim & Covell

[57] ABSTRACT

The gas bag (10) for a vehicular restraining system is formed by an annular hose (14). It is intended to protect against side impact and is characterized by fast inflation.

3 Claims, 2 Drawing Sheets

INFLATABLE GAS BAG FOR A VEHICULAR RESTRAINING SYSTEM

The invention relates to a gas bag for a vehicular restraining system.

Such a gas bag is inflated in an emergency and serves the vehicle occupant as an impact protective cushion. Known gas bags are formed in the shape of a balloon connected to an inlet opening for a gas generator. It is important that in the case of vehicle collision the gas bag is inflated quickly, i.e. within a few milliseconds. This is done by the gas bag being filled with gas from the gas generator. The time it takes to fill the gas bag with gas is highly significant particularly in the case of a side impact as compared to a frontal impact. Since the available space for deformation of the vehicle structure and thus for energy adsorption is very small a particularly fast filling of the gas bag is necessary.

The present invention provides a gas bag for lateral impact protection wherein the time required to fill the gas bag is considerably reduced.

According to the invention, the gas bag has the form of a hose, it having been found out that this hose configuration reduces the volume which needs to be filled with gas, one the one hand, and thus, on the other, making it possible to design the gas bag in many and varied ways and thus also better adapted to the purpose in a particular vehicle.

Figure 3:
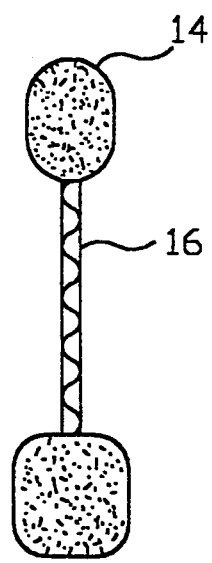
Figure 2:
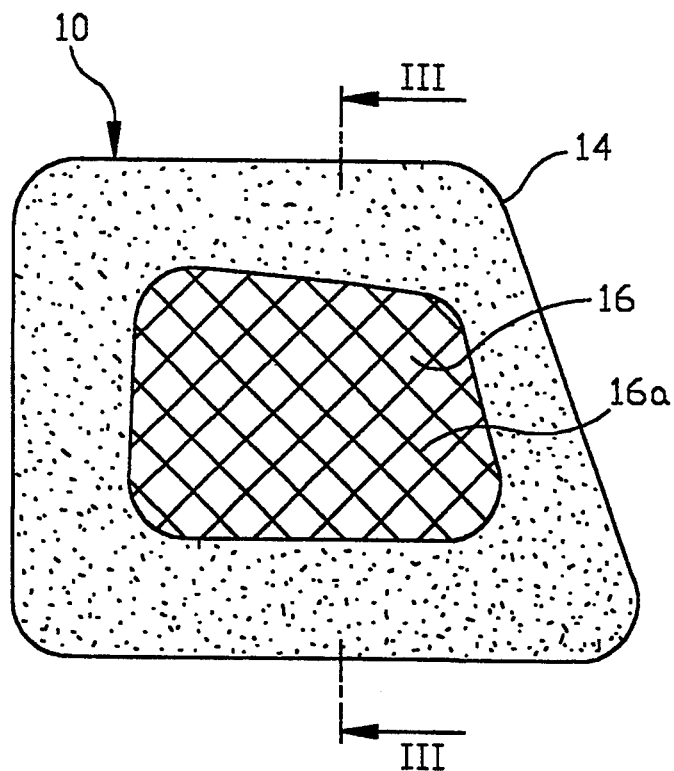
Figure 4:
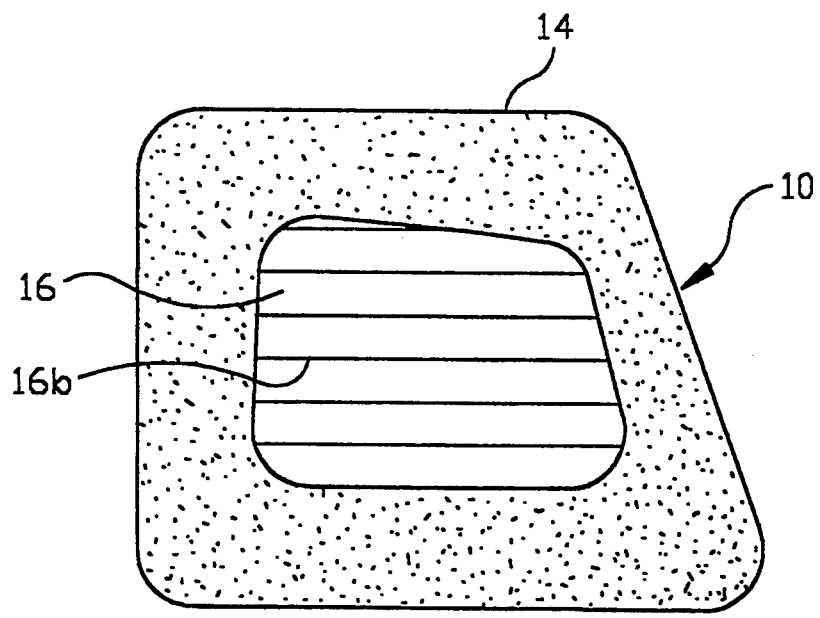

An embodiment of the invention will now be described in more detail with reference to the drawings in which FIG. 1 is a schematic side view of an inflated gas bag for a restraining system on a side door of a vehicle, FIG. 2 is a side view of the gas bag without side door, FIG. 3 is a section view of the gas bag along the line III—III in FIG. 2, and FIG. 4 is a schematic side view of a further embodiment of an inflatable gas bag.

FIG. 1 illustrates an inflated gas bag 10 as part of a vehicular restraining system which is secured to a side door 12 or in the roof area of the vehicle and serves in particular to protect the occupant against side impact. To enable the gas bag 10 to be inflated it is connected to a gas generator (not shown) which fills the gas bag 10 with gas within a few milliseconds.

As also shown by FIG. 2, the gas bag 10 has the form of an annular, endless hose 14. A fabric part 16 connected to the hose 14 extends across the internal region of the annular hose 14. This fabric part 16 and the wall of the hose 14 are made of the same material, the gas bag 10 namely being produced by applying stitches to a bag. These stitches run along the inside of the hose 14, thus forming the hose 14 and the fabric part 16. Accordingly the fabric part 16 comprises two walls of the bag stitched on each other and to each other. The fabric part 16 comprises further a quilted structure 16a similar to that produced in an air bed by stitching. The internal region of the fabric part 16 communicates with the hose 14 for the purpose of filling this internal region with gas.

This configuration of the gas bag 10 achieves a precise and stable orientation whilst reducing the filling volume and, therefore, the gas generator can be configured smaller.

FIG. 3 shows a section view of the gas bag 10 along the line III—III in FIG. 2 and makes it clear that the cross-section of the hose 14 changes over its length, thus making it possible to configure and optimize the shape and gas volume of the hose 14 in accordance with the application. The stitchings on the fabric part 16 are schematically shown in FIG. 3. Further as schematically shown in FIG. 3, two walls of the gas bag 10 are stitched together to provide the quilted structure 16a (FIG. 2) of the internal region. The two walls are superimposed and stitched along lines traversing the internal region.

The fabric part 16 connects the mutually facing outer regions of the wall of the hose 14, thus permitting improved positioning of the gas bag 10.

In FIG. 4 a further embodiment of an inflatable gas bag 10 is illustrated. With the exception of the fabric part 16 this gas bag 10 substantially corresponds to the gas bag 10 described above. Here, the fabric part 16 comprises namely a plurality of parallel tubular or hose-shaped webs 16b which are formed similar to those of an air bed. These are formed by a plurality of parallel stitchings and are in communication with the hose 14.

The gas bag 10 can be produced in the way as described above. However, another embodiment is also feasible in which the hose 14 is stitched, after which the fabric part 16 is stitched to the wall of the hose 14.

What is claimed is:

1. An inflatable gas bag for a passenger restraint system in vehicles, comprising, when inflated, a generally flat inner portion having a generally polygonal periphery with rounded corners, and an outer tubular portion connected to the periphery of and surrounding said inner portion forming a closed loop, said outer portion projecting on opposed sides of said inner portion and having an outer periphery of a generally polygonal shape with rounded corners, and said outer portion being designed to extend in the inflated condition along a portion of a vehicle side window to protect the passenger against lateral impact, wherein said inner and outer portions are defined by a pair of superimposed layers of fabric interconnected by stitches along lines and wherein said inner portion is formed by a plurality of straight tubular webs in communication with said outer portion.

2. An inflatable gas bag for a passenger restraint system in a vehicle comprising, when inflated, a generally flat portion having a first thickness and a tubular annulus circumscribing said flat portion with a second thickness larger than the first thickness, wherein said flat portion includes a pair of superimposed layers of fabric and wherein said flat portion includes a plurality of tubular webs in fluid communication with said tubular annulus.

3. An inflatable gas bag for a passenger restraint system in a vehicle comprising, when inflated, a generally flat portion having a first thickness and a tubular annulus circumscribing said flat portion with a second thickness larger than the first thickness, wherein said flat portion includes a pair of superimposed layers of fabric and wherein said flat portion is quilted and in fluid communication with said tubular annulus.

* * * * *